(12) United States Patent
Reese

(10) Patent No.: US 6,374,237 B1
(45) Date of Patent: *Apr. 16, 2002

(54) DATA SET SELECTION BASED UPON USER PROFILE

(75) Inventor: Kenneth W. Reese, Portland, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/773,642

(22) Filed: Dec. 24, 1996

(51) Int. Cl.[7] .................................. G06F 17/30
(52) U.S. Cl. ........................ 707/3; 707/9; 707/10; 709/217; 709/227
(58) Field of Search ................ 395/200.33, 680, 395/187.01, 200.09, 186; 707/10, 3, 2; 364/284.4, 282.1, 282.4; 709/217, 227, 228, 229

(56) References Cited

U.S. PATENT DOCUMENTS

| | | | | |
|---|---|---|---|---|
| 5,588,148 A | * | 12/1996 | Landis et al. ................ 707/1 |
| 5,644,404 A | * | 7/1997 | Hashimoto et al. ......... 358/402 |
| 5,671,354 A | * | 9/1997 | Ito et al. ................ 395/187.01 |
| 5,706,427 A | * | 1/1998 | Tabuki .................. 395/187.01 |
| 5,715,443 A | * | 2/1998 | Yanagihara et al. ........... 707/3 |
| 5,717,923 A | * | 2/1998 | Dedrick ...................... 707/102 |
| 5,724,567 A | * | 3/1998 | Rose et al. ..................... 707/2 |
| 5,727,129 A | * | 3/1998 | Barrett et al. ................. 395/12 |
| 5,796,393 A | * | 8/1998 | MacNaughton et al. .... 345/329 |
| 5,802,518 A | * | 9/1998 | Karaev et al. ................. 707/9 |
| 5,805,803 A | * | 9/1998 | Birrell et al. .......... 395/187.01 |
| 5,818,935 A | * | 10/1998 | Maa ............................. 380/20 |
| 5,848,396 A | * | 12/1998 | Gerace ........................ 705/10 |
| 5,907,836 A | * | 5/1999 | Sumita et al. ................. 707/2 |

\* cited by examiner

*Primary Examiner*—Jean M. Corrielus
(74) *Attorney, Agent, or Firm*—Blakely, Sokoloff, Taylor & Zafman LLP

(57) ABSTRACT

A method and a system for requesting and retrieving information from distinct web network content sites. The method includes providing a client adapted to send a request that contains a user profile, adapting a server, upon receiving the request, to retrieve data from the content sites that substantially matches the request, and delivering the data to the client. The method is useful in both the Internet and Intranet environment. The invention also relates to a system of requesting data from distinct network content sites. The system includes adapting a client to send a request that contains a user profile, and adapting a server to retrieve data that substantially matches the request from the content sites and deliver that data to the client. The system is useful in both an Internet and Intranet environment.

18 Claims, 7 Drawing Sheets

FIG. 3

```
GET /foo/getdata?item1&item2 HTTP/1.0
Accept: */*
User-Agent: Mozilla
```

FIG. 4

```
POST<URL>HTTP/1.0
Accept: */*
User-Agent: Mozilla
Content-Type: application/x-WWW-form-urlencoded
Content-length: 118
CRLF __
 |  text profile
 | Area Code = 503 &
 | Zip Code = 97229 &
 | State = Oregon &
 | Sex = M &
 | Age = 36 &
 | ...
 |__
```

FIG. 5

```
POST<URL>HTTP/1.0
Accept: */*
User-Agent: Mozilla
Content-Type: application/x-profile-demogragphic
Content-length: 418
CRLF __
 |
 |
 |
 |   binary profile
 |
 |
 |__
```

USER PROFILE-DEMOGRAPHICS

Document Title: 610

Document URL: 620

Search Type: 630

Area Code: 640

Zip Code: 650

State: 660

Sex: 670

Age: 680

Other: 690

Modify Profile 692 | Save Profile 694 | Submit Query 696

FIG. 6

DATA SET SELECTION BASED UPON USER PROFILE

BACKGROUND OF THE INVENTION

1. Field of the Invention

The invention relates generally to web browsing and more specifically to the retrieval of information from the Internet using the world wide web.

2. Description of Related Art

The World Wide Web brings the vast amount of information on the Internet to the public's attention. A problem today in web browsing is that browsing is essentially flat, with no semantic meaning applied to query and search mechanisms. Between the client, an application program that establishes connections for the purpose of sending requests from a user, and the server, an application that accepts connections in order to service requests by sending back responses, there exists a bandwidth problem of not being able to get information quickly enough to the user on the client end to do meaningful operations.

Search engine servers have been developed to allow a user to transmit a request from a client to retrieve data. Search engines rely on a user formulated query to retrieve data. In this case, a client transmits a request to a search engine server to search content sites (e.g., other servers) on the Internet for information based on user-selected "keywords." The search engine searches the web and retrieves data that matches the keywords, then transmits the matching data to the client.

The problem with the typical search engine model is the difficulty in paring down the retrieved data to data that is meaningful to the user. The wealth of information available on the Internet usually translates into a tremendous amount of matching data delivered to the client that the user must sort through to find the most meaningful material. One tool that has been developed to limit the information to particular clients is through server-based filters. Using these server-based filters, users subscribe to a service and the service delivers user-queried data to the client. The specificity of the data is determined by the user through preselected content sites such as news, sports, weather, and stock market updates. The user-selected information is stored on the service. These services typically deliver the entire content site to the server which delivers the same to the client (e.g., all stocks) or further filters the data delivered to the client (e.g., specific stocks). A problem with this system is the user still sees the entire content sites or, in the case of further filtering by the service, the user does not determine in what is delivered unless the user changes the user's selected categories of data.

SUMMARY OF THE INVENTION

A method and a system for requesting and retrieving information from distinct web network content sites is disclosed. The method includes retrieving by a server of a first set of pre-determined data from said content sites, sending a request from a client, wherein the request contains the user profile, and adapting the server, upon receiving the request, to retrieve a second set of data from the first set of data, wherein the second set of data matches the request, and delivering the second set of data to the client.

The system of the invention includes a client adapted to send a request that contains a user profile, and a server adapted to retrieve a first set of pre-determine data. Upon receiving the request from the client, the server is adapted to retrieve a second set of data from the first set of data that substantially matches the request and deliver the second set of data to the client.

Additional features and benefits of the invention will become apparent from the detailed description, figures, and claims set forth below.

BRIEF DESCRIPTION OF THE DRAWINGS

FIG. 3 presents a computer program that is a GET request to deliver a user profile to the server with the request, wherein the GET request is in the form of a URL encoded GET request.

FIG. 4 presents a computer program that is a POST request to deliver a user profile to the server, wherein the POST request is in the form of a URL encoded POST request.

FIG. 5 presents a computer program that is a POST request to deliver a user profile with the client request, wherein the program is a POST request that presents a binary profile.

FIG. 6 presents an example of a form user profile.

FIG. 7 presents an example of retrieving a user profile for a request wherein the user profile is in the form of a plug-in.

DETAILED DESCRIPTION OF THE INVENTION

The invention relates to a method of and system for requesting and retrieving information from distinct network content sites. In the following description, numerous specific details are set forth such as specific configurations, programs, and systems. It will be obvious, however, to one skilled in the art that these specific details need not be employed to practice the invention. In other instances, well-known systems or methods have not been described in detail in order to avoid unnecessarily obscuring the invention.

Figure 1:
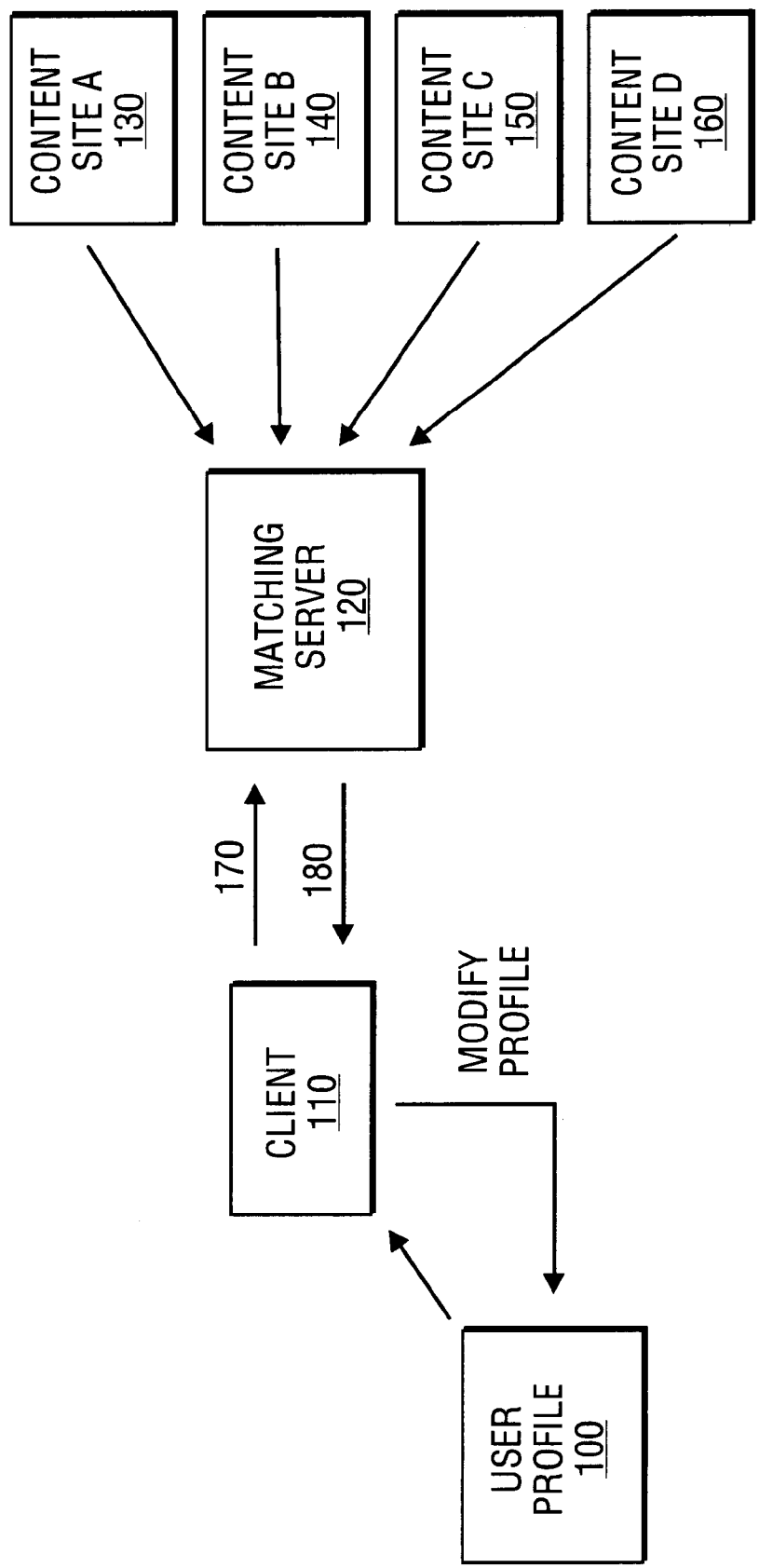
FIG. 1 presents a block diagram of and system of the invention.

FIG. 1 presents a block diagram of the invention. FIG. 1 shows a client 110 that is an application program that establishes connections for the purpose of sending requests to a matching server 120. The client 110 contains a user agent that initiates the request. The user agent is, for example, a browser, editor, spider (web-traversing robot), or other end user tool that can service different requests by a user. Typical browsers include NETSCAPE NAVIGATOR™ or INTERNET EXPLORER™. The matching server 120 is an application program that accepts connections in order to service requests by sending back responses. In the case of a browser, a request is sent in a typical protocol, for example, hypertext transfer protocol (HTTP). Other protocols include Simple Mail Transfer Protocol ("SMTP"), Network News Transfer Protocol ("NNTP"), File Transfer Protocol ("FTP"), Gopher, and Wide Area Information Service ("WAIS").

The HTTP protocol is based on a request/response paradigm. A client establishes a connection with a server and sends a request to the server in the form of a request method, Uniform Resource Identifier ("URI"), and protocol version, followed by a Multi-Purpose Internet Mail Extension ("MIME")-type message containing request modifiers, client information, and possible body content. The server responds with a status line, including the message's protocol version and a successor error code, followed by MIME-type message containing server information, entity meta information, and possible body content. Most HTTP communication is initiated by a user agent, e.g., a browser, and consists of a request to be applied to a resource on some origin server. URI is the generic term for a coded string that identifies a (typically Internet) resource. There are currently two practical examples of URIs, namely Uniform Resource Locators (URLs) and relative URLs. Client requests using an HTTP protocol typically make requests using a URL. The URL is sent to the server and the server returns a document specific to the HTTP request, typically in Hyper Text Markup Language ("HTEL").

The invention contemplates that the matching server 120 walks various content sites (e.g., servers 130–160) on the Internet (or other linked network) to retrieve a pre-determined aggregate of data. FIG. 1 shows matching server 120 retrieving data from content site A 130, content site B 140, content site C 150, and content site D 160. The pre-determined data includes, but is not limited to, data based on broad interest categories, such as sports, leisure, travel, finances, as well as more specific information including, but not limited to, demographics. The matching server 120 digests this information in an organized format to expedite search requests directed at the pre-determined aggregate data.

Next, client 110 initiates a user profile request 100 to matching server 120. The matching server 120 applies the user profile request 100 against the pre-determined aggregate data. The aggregate data that matches the client request is returned to the client 110 by way of an HTML document. The client 110 is then instructed to review the retrieved data and may go to various content sites 130–160 for more information through links in the HTML document returned to the client or to request that the entire contents of a particular content site 130–160 be delivered to the client 110. Alternatively, the user can modify the user profile and execute a new search.

The invention contemplates that the matching server 120 works with the client user profile request 100 to pare down the data delivered to the client. The matching server 120 pre-selects an aggregate of data that is determined to be the most relevant to different sets of user profile requests 100. The matching server 120 does this by searching various content sites 130, 140, 150, 160 on the Internet or other network. A user profile request 100 is applied against the matching server 120 aggregate of data like a sieve, and only data matching the user profile request 100 is returned to the client 110. The invention contemplates that the matching server 120 need not match the user profile 100 exactly, but can accommodate a user's designated acceptable range of variability, i.e., a quality factor.

Figure 2:
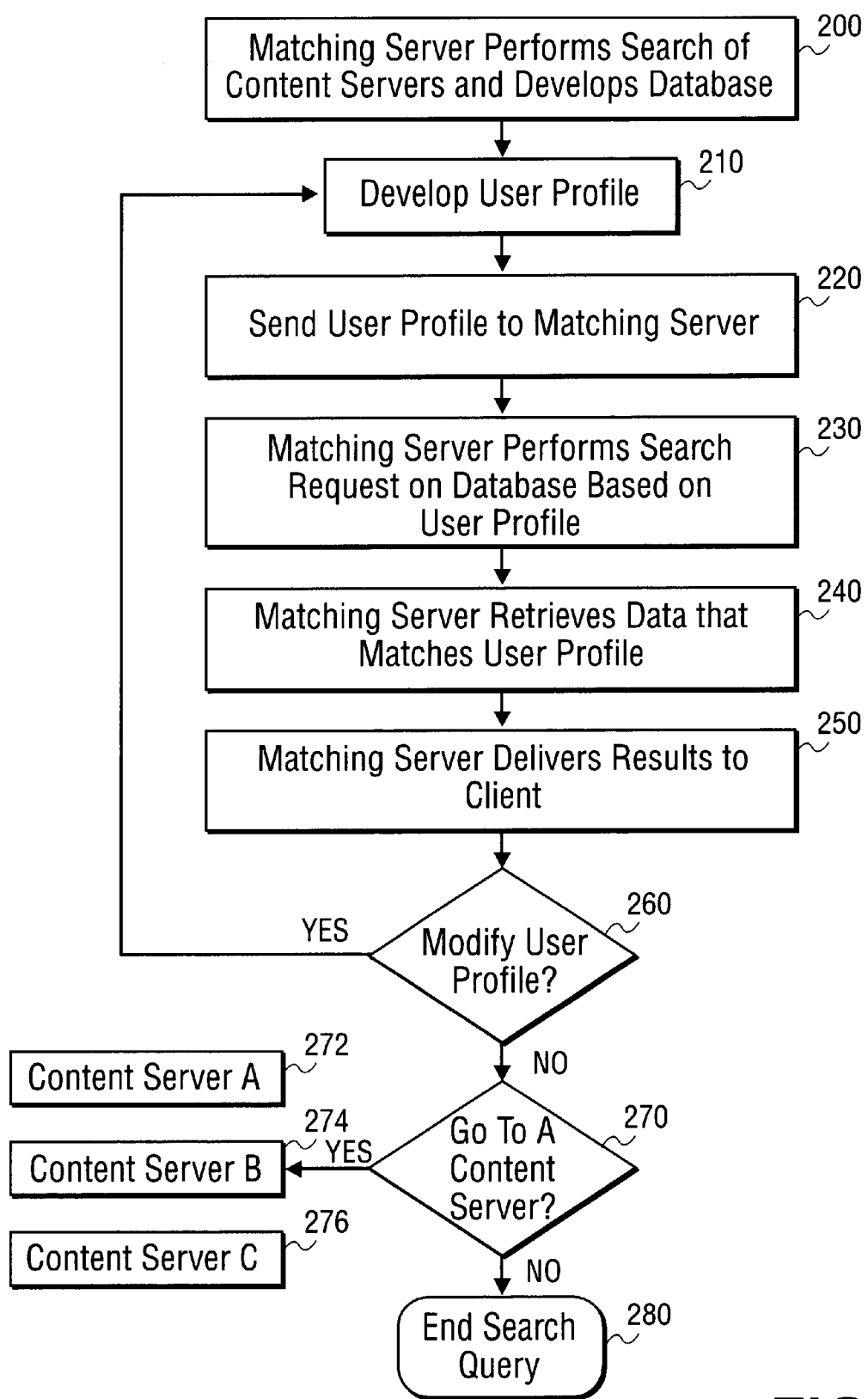
FIG. 2 presents a flow chart of the method of the invention.

FIG. 2 illustrates a flow chart of the invention. In FIG. 2, a matching server 200 is developed made up of predetermined data that has been designated desirable to collect. Data might be designated desirable, for example, by the number of previous times the data has been accessed by users of a certain demographic. The matching server 200 organizes the data into a manageable form. For example, an advertising agency seeking to target ten different sets of customers would collect information to target all of the ten different sets of customers. Certain characteristics would be associated with each of the ten sets of customers. The database that would be collected and organized would be an aggregate of data determined by the advertising agency to be relevant to all of the customers.

Next, in step 210, a user wishing to retrieve information from the matching server, submits a user profile, preferably in the form of an algorithm that works with the algorithm the server used to represent the aggregate of the collected data. In step 220, the client then sends the user profile developed by the user to the matching server. At step 230, the matching server performs a search request on its database based on the user profile. At step 240, the matching server retrieves data from its database that matches the user profile. At step 250, the matching server delivers the results to the client. In the example wherein the matching server is developed by an advertising agency, profiles from the targeted customers would be delivered to the matching server, and the aggregate of data in the matching server would be applied against the desired profile. Data that matched the submitted profile would be returned to the client.

Based on the delivered results, the client prompts (step 260) the user to modify the user profile request. If the user wishes to modify the user profile request, the client can send the modified user profile to the matching server to conduct a further search of the content sites. If the user elects not to modify the user profile, the user may, in step 270, review the data and further act on the data by going to individual content servers 272, 274, or 276, or request that the entire contents of a server 272, 274, or 276 be delivered to the client through links returned in the HTML document. Once the user has the retrieved data, the user can end the session (step 280).

The user profile is intended to focus the retrieved results on meaningful data. One type of user profile is related to the demographics of the user. For example, the user profile might include the area code, zip code, state, sex, and age of a user. With such a profile, the matching server would retrieve data to the client related to the client's demographics. For example, if the user were interested in current events in the state of Oregon, the matching server would retrieve data and compile an aggregate database relating to current events pertinent to the user's age and area, e.g., Portland. Similarly, if the user sought information regarding retail purchases, the matching server would retrieve data relevant to the user's demographics. A demographics user profile is also very effective for advertisers that wish to advertise their goods or services on the matching server so that specific advertisements can be targeted at user's with specific user profile demographics. Other user profiles include, but are not limited to, areas of interest, business, politics, religion, education, etc.

FIGS. 3–5 illustrate program code for HTTP transmitted user profiles. FIG. 3 presents a user profile that is a GET method request. The GET method client request includes a request header containing header fields. In this case, the header fields include: (1) A method header field: Get <URL> HTTP/1.0; (2) an accept field, "*/*", indicating that the client will accept any type of data, e.g., text, graphics, etc; and (3) a user-agent field indicating that the user agent, in this case, is Netscape editor Mozilla.

For a simple GET method client request, the user profile is added onto the search request "GET data". The user profile in FIG. 3 would be "item 1 & item 2" where "item 1" and "item 2" are data that make up the user profile. FIG. 3 indicates a user profile that is two items of data. It is to be understood, that a user profile can take on much larger forms and be much more specific than that presented in FIG. 3.

FIGS. 4 and 5 illustrate a POST method request made up of a request header with several header fields. The POST method sends data in a message body, not in the URL. Consequently, no data is appended to the URL. The POST method includes two new request header fields not seen with the GET method request: content-type and content-length. These header fields tell the server that there will be data following the request header. The content-length field gives the length in bytes of the message, while the content-type field specifies the MIME type of the message being sent to the server. FIG. 4 illustrates a widely implemented content-type for FORM data being sent to a server, namely:

Content-type: application/x-www-form-urlencoded This header indicates that the data is from a form and that it is encoded in the same manner as when appended to a URL. When an HTML FORM submits data to an HTTP server using the POST method, the FORM data are sent to the server as a message body that follows the request header. This message body is generally encoded in the same manner as when appended to the URL. This is contrasted with an HTML FORM that submits an HTTP server request using the GET method, wherein the form data is appended to the URL as a query string. In the latter case, the form data are sent to a query string part of the locator string, in the request header method field.

The content-length field specifies that the user profile is 118 bytes. By specifying a content-length, the server knows when to finish reading the POST request. The POST request and URL-encoded form is set forth below the carriage return line feed ("CRLF"). In FIG. 4, a demographic user profile is shown in text form. The user profile includes the area code, zip code, state, sex, age, and other information about the user. In FIG. 5, similar information is provided in a binary format. In FIG. 5, the server knows that there is a POST request of 418 bytes of binary code to be posted to the URL. To accept this type of binary information, the server must be capable of understanding binary format. The binary format allows the user profile to be submitted in a more condensed form.

FIG. 6 illustrates a user profile form 600 that can be displayed by the User-Agent (e.g., browser) to allow a user to complete a specific user profile that the matching server will accept to refine search requests to more meaningful data. The form 600 used in FIG. 6 is displayed on the client and allows the user to quickly and easily enter and modify the user profile. FIG. 6 presents a user profile form 600 relating to a user profile of demographics. The document form 600 may be in standard HTML text. The form 600 includes a document title and a document URL 620. The document title 610 specifies that the form is a user profile form. The document URL 620 specifies the query string.

The user profile form 600 includes a Search Type field 630 that allows a user to select whether the user wants an exact match of the user profile with the search data or whether the user will accept some lesser amount of exactness as acceptable for retrieved data. The user profile form 600 further allows the user to enter demographics specific to the user. In FIG. 6, the demographics include area code 640, zip code 650, state 660, sex 670, age 680, and some other identifiers 690. Once the user enters the appropriate data in the user profile form 600, the user is instructed to save the profile by a "Save Profile" 694 button. This allows the user to save his user profile and include the user profile in subsequent searches at subsequent times without having to repeat the steps of completing a user profile for each search. Once the form is completed, the user may submit the user profile by indicating its submission with the "Submit Profile" 696. In this case, the user profile will be submitted with the search request as either a POST or GET method request as specified above with reference to FIGS. 3–5 and the accompanying text.

The form 600 presented in FIG. 6 provides an easy way for a user to designate profile information. In this case, the user is not required to entirely imagine the user's own profile, but may rely on a form that is developed for the user to send such a profile. Such a form profile can be distributed in conjunction with the development of the matching server, so that the profiles sent to the matching server would contain only meaningful data for the particular matching server. It is to be understood that the user profile need not be submitted in an algorithm form that is completely compatible with the algorithm by which the aggregate data of the matching server is organized. For example, a GET method request with user profile information appended to the end of the URL. In that case, a targeted user can type any search data that may or may not be relevant to the aggregate data of the matching server. If a portion or all of the user profile was not contained in the database, the matching server would not return data related to that portion of the profile not contained in the database.

The examples thus far presented a user profile and a browser that natively handles the user profile, for example, through a GET method or POST method request. The invention also contemplates that the user profile may be a client program that the browser does not handle natively. In other words, the profile is presented to the matching server in a MIME-type that the browser does not natively understand. In such a case, the browser requires an agent to transmit the profile. An example of this would be a "plug-in" software module installed on the client. Plug-ins are currently used in many applications to handle requests not native to the browser.

Figure 7:
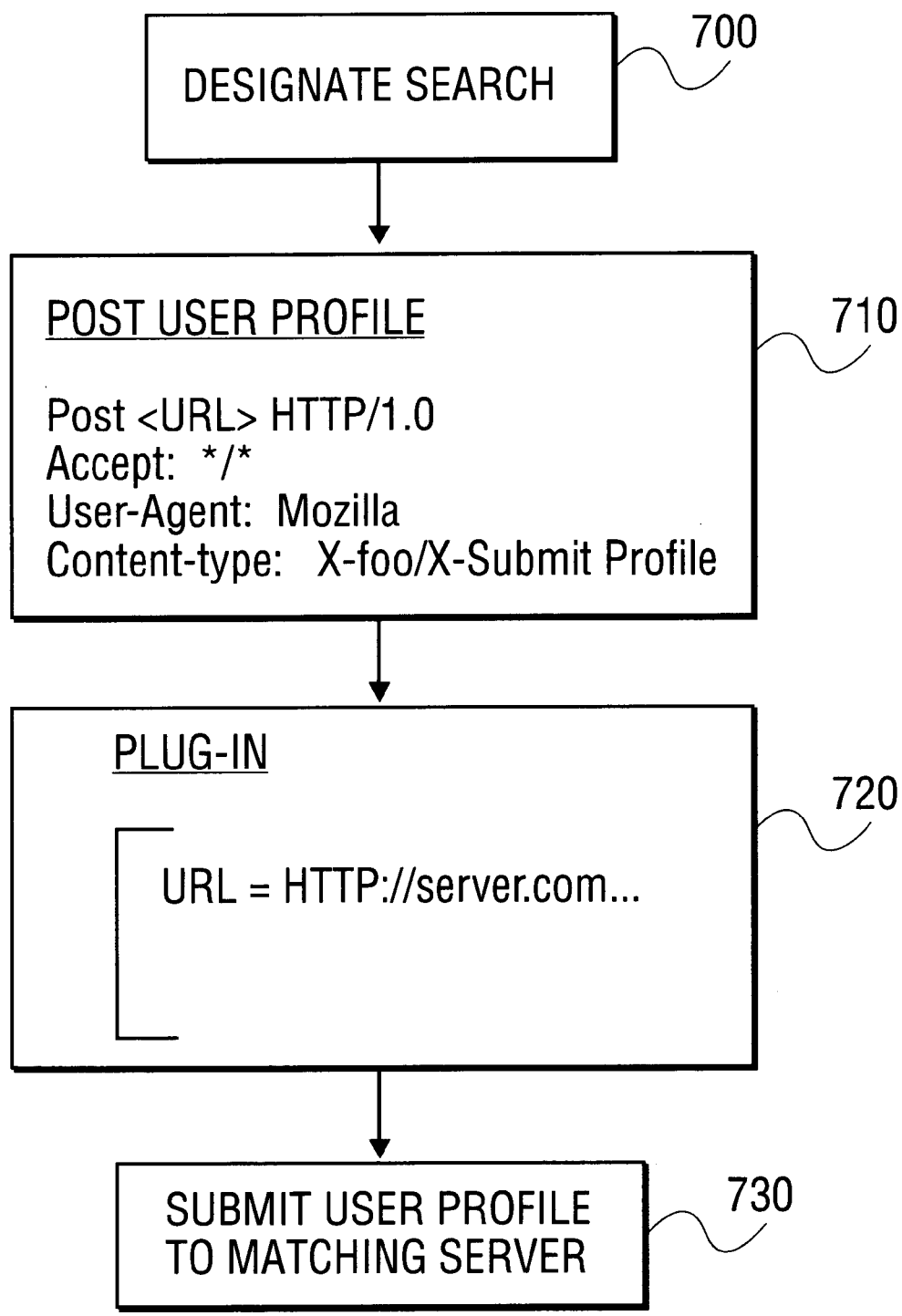

FIG. 7 presents a flow chart showing the use of a user profile in the form of a plug-in that works with a client browser to submit a user profile to the matching server. The flow chart shows that a user designates a search 700. The user then instructs the browser to retrieve the user profile in step 710, and the browser, using a POST entitled "Submit Profile", looks on the client for a plug-in to manage and submit the user profile to the matching server. For example, with a typical browser, the instruction to post the user profile is handled by a plug-in. On the client will be a plug-in that is activated to handle the POST request. Once the plug-in is activated, step 720, the plug-in manages the transaction between client and server. In step 730, the plug-in submits the user profile in the form of a request to the matching server.

Figure 8:
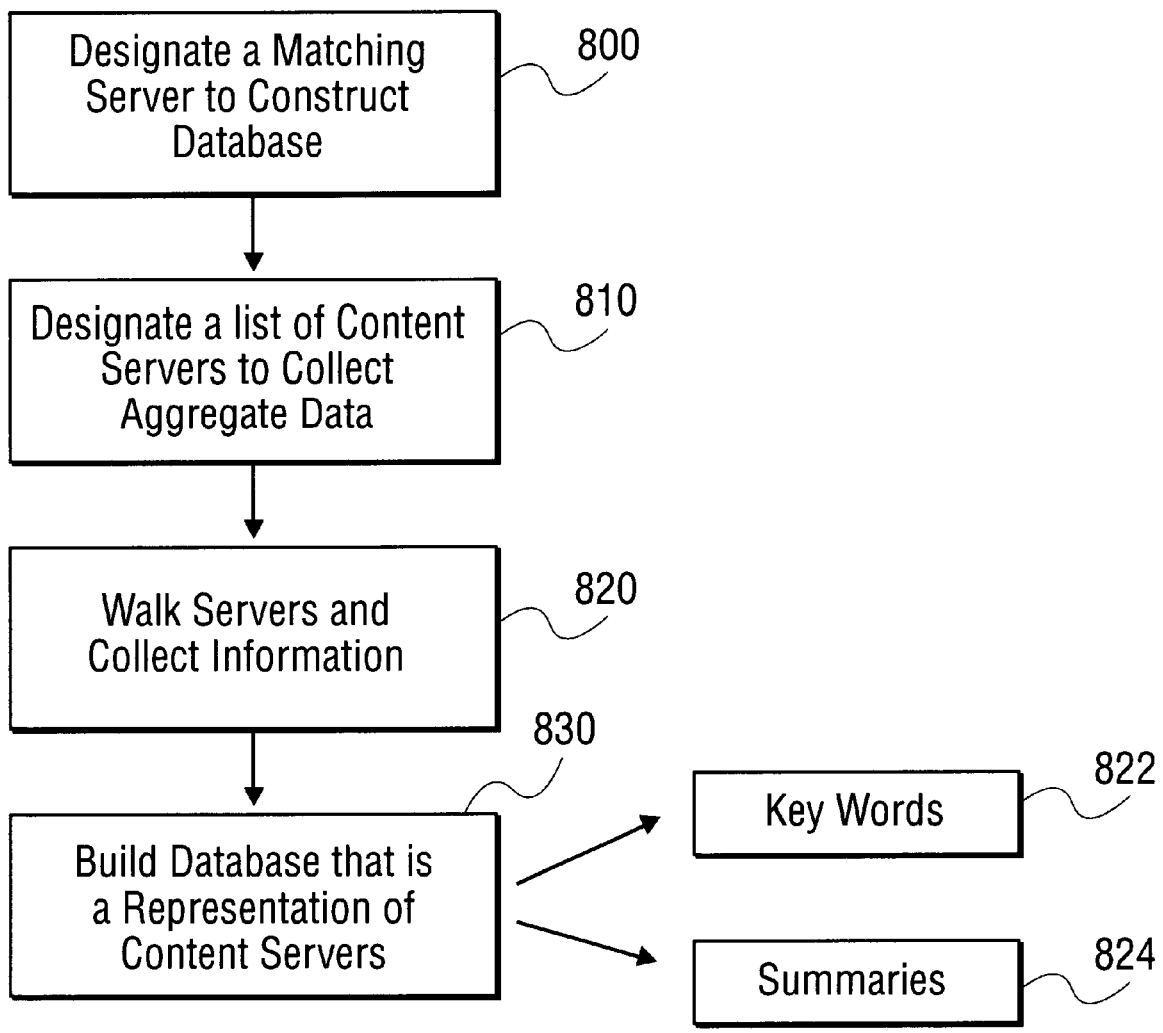
FIG. 8 presents a flow chart of the construction and organization of the matching server aggregate database.

FIG. 8 presents a flow chart of the construction of a matching server database of the invention. In FIG. 8, a matching server is designated. In step 800, a matching server is designated to construct an aggregate database. In step 810, a list of content servers is designated from which to collect data that will make up the aggregate data of the matching server. The content servers designated could be any or all servers in an Internet environment or select servers in an Intranet or other network environment. Next, in step 820, the matching server walks each of the content servers and collects information that will make up the aggregate database. Next, in step 830, the matching server builds an aggregate database that is a representation of the content servers walked.

In collecting the information that matches the query request, the server may collect different forms of information. First, the server may collect entire content site data, for example, entire files or documents on a particular content server. Instead, the server may collect key words from particular sites (e.g., files) on individual content servers, monitor how often such key words are used in a document, and construct a database based on these key words (step 822). Another way of collecting data is through the collection of content summaries (step 824). In this manner, rather than entire files or documents being transmitted to the server and ultimately to the client, only summaries of the documents or files are collected and presented. The summaries offer a better description of the content of the particular files or documents than the key words, because the user can form a better opinion of what is contained in the abbreviated document or file based on summaries rather than a few key words. The summaries may be as simple as collective abstracts or may involve the matching server identifying often used key words and extracting phrases or sentences using these key words from the document. Finally, the invention contemplates that titles may also be retrieved by the matching server and submitted to the client rather than entire documents or files.

Figure 9:
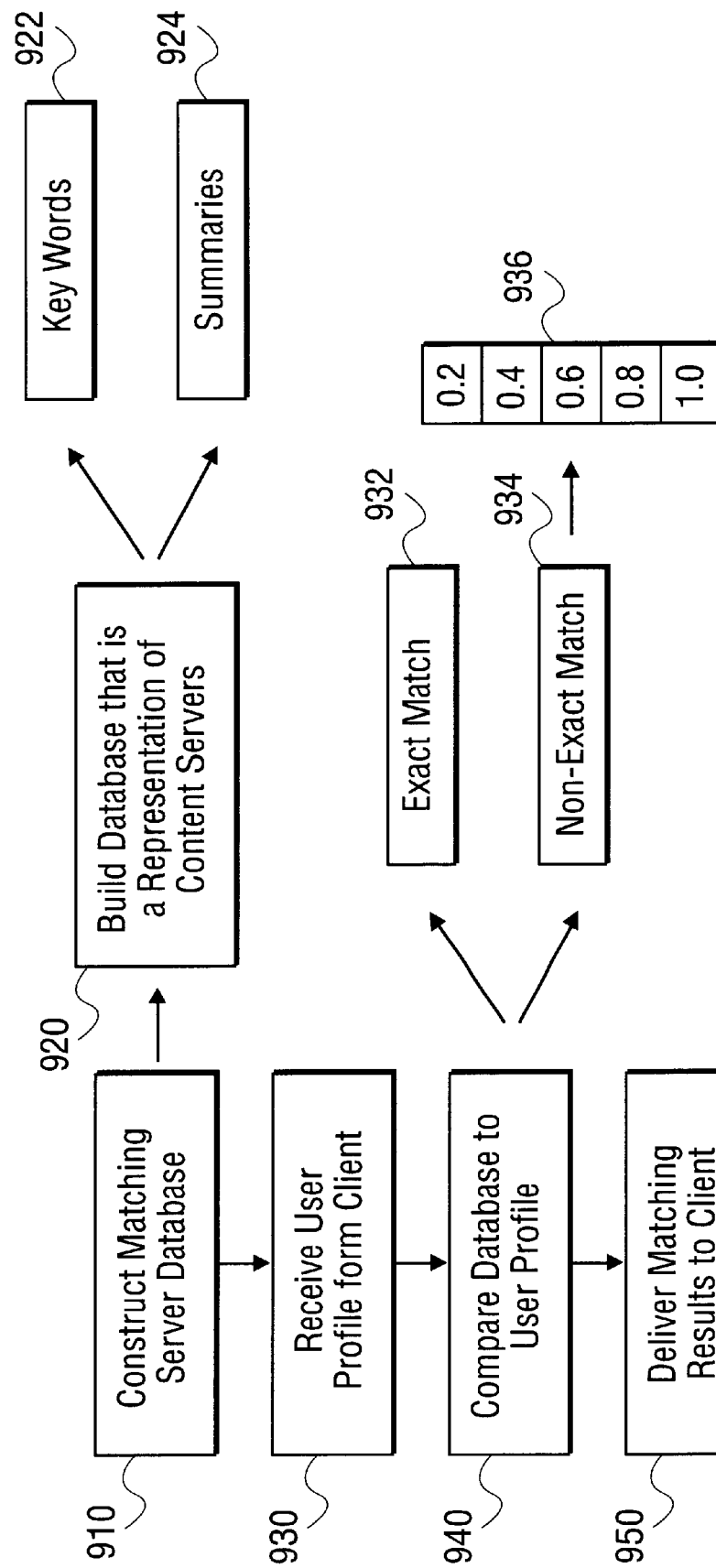
FIG. 9 presents a flow chart of a matching server adapted to retrieve data from content sites that correspond to a client request that contains a user profile.

FIG. 9 describes the relationship between a matching server and a user profile in the invention. In order to be useful in the invention, the matching server must be able to recognize a user profile, in whatever form (i.e., URL-encoded, binary, etc.), and apply the user profile to the retrieved data. FIG. 9 illustrates a flow chart of the operation of a matching server that recognizes a user profile and applies such user profile to content site data that the matching server has previously assembled. First, in step 910, the matching server constructs an aggregate database. The matching server, in step 920, designates a list of content servers from which to categorize matching information. The list of servers can be connected via the Internet or may be locally connected in an Intranet or other network environment to the matching server. The matching server walks the content servers and collects the relevant information. The aggregate may be organized, for example, in the form of key words 922 or document summaries 924 as discussed above. The invention also contemplates that the collection of aggregate data may be a continuous process. In other words, the matching server continually updates its aggregate database by continuing to search content sites.

Next, in step 930, the matching server receives a search request that includes a user profile from a client. In step 940, the matching server compares the data in the aggregate database to the user profile supplied by the client. The matching server then delivers the matching data to the client in step 950.

When assessing the database constructed by the matching server to the user profile, the matching server may require an exact match or a non-exact match. For an exact match, it is contemplated that each and every element of the user profile match that of the data collected in the query database on the matching server. If such stringent requirements are not necessary, the user may designate a lesser standard of stringency and retrieve data that is not an exact match to the query data and the user profile. In FIG. 9, for example, if the user profile contained ten distinct data categories, i.e., demographic specifics, a user might designate a non-exact match 934 and then only require a level of stringency 936 of between 20 and 80 percent matching. If the user demanded only two of ten elements of the user profile correspond to the retrieved data, the user might designate a non-exact match of 0.2 or 20 percent. Similarly, if the user wanted 80 percent accuracy, the user designates 0.8.

Instead of a match/non-exact match system, the invention contemplates that the retrieved data be associatively matched to the user profile. For instance, the user profile can specify as a profile increment "fruit". The matching server would retrieve matching data that includes the various kinds of fruits, i.e., apples, oranges, etc. In such case, the matching server must be intelligent to know that an apple or an orange is a "fruit". It is known in the art to employ various methods to accomplish artificial intelligence with computer systems, wherein artificial intelligence may be described as a system in which a computer is able to reach conclusions based on certain inputs after it has been trained or instructed in a certain set of rules or experiences. The most popular artificial intelligence systems are the so called "heuristic search" models as well as "associative memory" systems and "connectionist" models. An associative memory system, for example, solves a current problem by examining symptoms or characteristics of the problem and comparing those systems to previous solutions to the problem. The invention contemplates that an associative user profile may be implemented with known artificial intelligent systems.

Thus far, the invention is focused on a user-created user profile. The invention also contemplates that the user profile may be constructed by the client based on the user's search habits. In other words, an artificial intelligence system may be created to develop a user profile. In the same way that a system is trained to be associative with regard to matching profile elements, the entire profile may be trained based on a user's search habits. For instance, a user profile that relates to demographics can be trained by recognizing user habits relating to demographics. Where a user conducts searches focusing on the Portland area of Oregon, the user profile is trained to recognize the City of Portland, Oregon as a profile criteria. Similarly, if the user conducts searches of information for males of a certain age group or income, the user profile will be trained to recognize these criteria. Once again, the invention contemplates that the user profile be constructed automatically with known artificial intelligence systems. Similarly, the matching server would monitor search requests and create aggregate data based on such search requests to compare against the user profile. Such automatic profile/matching server is ideal for advertisers that want to target specific advertisements at specific profiles. For instance, an advertising agency matching server can construct an aggregate advertisement database triggered by demographics. The matching server could then deliver target local and/or national advertisements to particular user profiles. These advertisements can be designated to be returned continuously while a-user is logged on to the network.

In the preceding detailed description, the invention is described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method of requesting and retrieving information from distinct Internet content sites, comprising:

retrieving by a server of a first set of content data from said content sites;

sending a request from a client, wherein said request contains a user-modifiable user profile;

ranking said first set of content data based on said user profile;

adapting said server, upon receiving said request, to retrieve a second set of content data from said first set of content data, wherein said second set of content data substantially matches said request;

delivering said second set of content data to said client; and configuring the client to prompt a modification to the user profile.

2. The method of claim 1, wherein said network is an Internet.

3. The method of claim 1, wherein said network is an Intranet.

4. The method of claim 1, wherein said step of sending a request from a client further comprises the steps of:

providing a network browser adapted to send said request to said server; and adapting said network browser to incorporate said user profile in said request.

5. The method of claim 4, wherein said user profile is integral to said browser.

6. The method of claim 5, wherein said user profile is added to said request by one of a post method and a get method.

7. The method of claim 4, wherein said user profile is generated by a plug-in installed on said client and incorporated into said browser with said request.

8. The method of claim 1, further comprising the step of constructing said user profile based on said first set of data.

9. The method of claim 1, wherein said first set of data is one of key words, summaries, and headers, and wherein said method further comprises providing a user prompt on said client to send a request to a content site containing said retrieved data.

10. A system of requesting and retrieving data from distinct network content sites, comprising:

a client adapted to send a request, wherein said request contains a user-modifiable user profile;

a server adapted to retrieve pre-determined first set of content data;

wherein, upon receiving said request from said client, said server ranks the first set of content data and retrieves a second set of content data from said first set of content data that substantially matches said request and delivers said second set of content data to said client;

wherein, upon receiving said second set of content data from said server, said client prompts a modification of said user profile.

11. The system of claim 10, wherein said network is the Internet.

12. The system of claim 10, wherein said network is an Intranet.

13. The system of claim 10, wherein said client is adapted to send a request by:

providing a network browser computer program adapted to send said request to said server; and adapting said network browser to incorporate said user profile in said request.

14. The system of claim 13, wherein said user profile is added to said request by one of a post command and a get command.

15. The system of claim 13, wherein said user profile is a computer program installed on said client and incorporated into said browser with said request.

16. The system of claim 13, wherein said retrieved data is one of key words, summaries, and headers, and wherein said browser displays a prompt on said client to send a request to a content site containing said first set of data.

17. The system of claim 10, wherein said user profile is modified based on said first set of data.

18. The system of claim 17, wherein said user profile is modified automatically.

* * * * *

UNITED STATES PATENT AND TRADEMARK OFFICE
CERTIFICATE OF CORRECTION

PATENT NO.    : 6,374,237 B1
DATED         : April 16, 2002
INVENTOR(S)   : Reese It is certified that error appears in the above-identified patent and that said Letters Patent is hereby corrected as shown below:

<u>Column 3,</u>
Line 19, delete "HTEL" and insert -- HTML --.

<u>Column 10,</u>
Line 16, delete "is the" and insert -- is an --.

Signed and Sealed this

Seventh Day of January, 2003

JAMES E. ROGAN
*Director of the United States Patent and Trademark Office*